US 12,486,799 B2

(12) United States Patent
Oriol et al.

(10) Patent No.: US 12,486,799 B2
(45) Date of Patent: Dec. 2, 2025

(54) TURBINE ENGINE COMPRISING AN OIL SUPPLY SYSTEM

(71) Applicant: SAFRAN AIRCRAFT ENGINES, Paris (FR)

(72) Inventors: Sébastien Oriol, Moissy-Cramayel (FR); Thibault Maxime Adrien Mallet, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/694,870

(22) PCT Filed: Sep. 27, 2022

(86) PCT No.: PCT/FR2022/051811
§ 371 (c)(1),
(2) Date: Mar. 22, 2024

(87) PCT Pub. No.: WO2023/052719
PCT Pub. Date: Apr. 6, 2023

(65) Prior Publication Data
US 2024/0401530 A1    Dec. 5, 2024

(30) Foreign Application Priority Data

Sep. 30, 2021  (FR) ...................................... 2110348
Sep. 30, 2021  (FR) ...................................... 2110349

(51) Int. Cl.
*F02C 7/06*     (2006.01)
*F01D 17/26*    (2006.01)
*F01D 25/20*    (2006.01)

(52) U.S. Cl.
CPC ................ *F02C 7/06* (2013.01); *F01D 17/26* (2013.01); *F01D 25/20* (2013.01);
(Continued)

(58) Field of Classification Search
CPC ........... F01D 7/00; F05D 2270/80; F02C 7/06
See application file for complete search history.

(56) References Cited

U.S. PATENT DOCUMENTS 2,888,097 A  *  5/1959  Scheffler, Jr. .......... F16N 39/005
                                                      55/400
7,118,336 B2 * 10/2006  Waddleton ................ F02C 7/32
                                                      184/6.12
(Continued)

OTHER PUBLICATIONS

International Search Report mailed Jan. 9, 2023, issued in corresponding International Application No. PCT/FR2022/051811, filed Sep. 27, 2022, 6 pages.
(Continued)

*Primary Examiner* — Michael A Riegelman
(74) *Attorney, Agent, or Firm* — CHRISTENSEN O'CONNOR JOHNSON KINDNESS PLLC

(57) ABSTRACT

A turbine engine includes an oil supply system that has a main oil tank, a supply pump with an inlet and an outlet connected to a control system, an auxiliary oil tank, and a valve having a first inlet connected to the main tank, a second inlet connected to the auxiliary tank and an outlet connected to the inlet of the supply pump. The valve also has a member configured to move within the body and between a first position, in which the first inlet of the valve is in fluid communication with the outlet of the valve, and a second position, in which the second inlet of the valve is in fluid communication with the outlet of the valve.

16 Claims, 8 Drawing Sheets

(52) U.S. Cl.
CPC .. *F05D 2220/323* (2013.01); *F05D 2260/406* (2013.01); *F05D 2260/98* (2013.01); *F05D 2270/807* (2013.01)

(56) References Cited

U.S. PATENT DOCUMENTS

| | | | | |
|---|---|---|---|---|
| 8,051,869 B2* | 11/2011 | Parnin | ................... | F16K 17/36 137/1 |
| 8,985,278 B2* | 3/2015 | Xu | ................... | F01D 25/20 184/6.11 |
| 9,981,752 B2* | 5/2018 | Bergeron | ................... | B64D 37/14 |
| 11,555,418 B2* | 1/2023 | Younes | ................... | F01D 25/20 |
| 11,732,646 B2* | 8/2023 | Gauthier | ................... | F01D 25/20 184/6.11 |
| 2005/0135929 A1* | 6/2005 | Waddleton | ................... | B64C 11/38 416/1 |
| 2006/0054406 A1* | 3/2006 | Delaloye | ................... | F01D 25/18 184/6.11 |
| 2010/0065374 A1* | 3/2010 | Szolomayer | ................... | F01M 11/067 700/282 |
| 2010/0294371 A1* | 11/2010 | Parnin | ................... | F16K 17/36 137/1 |
| 2010/0294597 A1* | 11/2010 | Parnin | ................... | F01D 25/18 184/26 |
| 2011/0108360 A1* | 5/2011 | DiBenedetto | ................... | F01D 25/18 184/6.11 |
| 2011/0314830 A1* | 12/2011 | Legare | ................... | F01D 25/20 60/39.08 |
| 2013/0319798 A1* | 12/2013 | Sheridan | ................... | F01D 25/20 184/6 |
| 2014/0069743 A1* | 3/2014 | Xu | ................... | F01D 25/18 184/6.11 |
| 2020/0200043 A1* | 6/2020 | Parnin | ................... | F02C 7/06 |
| 2020/0392866 A1* | 12/2020 | Younes | ................... | F16C 19/52 |
| 2024/0131457 A1* | 4/2024 | Muller | ................... | B64D 45/00 |
| 2024/0288117 A1* | 8/2024 | Mallet | ................... | F01M 11/10 |
| 2024/0384668 A1* | 11/2024 | Oriol | ................... | F01D 25/20 |
| 2024/0392695 A1* | 11/2024 | Oriol | ................... | F01D 25/18 |
| 2024/0401530 A1* | 12/2024 | Oriol | ................... | F01D 7/00 |

OTHER PUBLICATIONS

Written Opinion mailed Jan. 9, 2023, issued in corresponding International Application No. PCT/FR2022/051811, filed Sep. 27, 2022, 4 pages.

* cited by examiner

TURBINE ENGINE COMPRISING AN OIL SUPPLY SYSTEM

FIELD OF THE DISCLOSURE

The disclosure relates to the field of aircraft turbine engines comprising variable pitch angle vanes and an oil supply system.

BACKGROUND

The prior art is illustrated by documents US-A1-20050135929 and US-A1-2020392866. A turbine engine for an aircraft comprises, from upstream to downstream, at least one first rotor, also referred as a thruster rotor, such as a propeller when the turbine engine is a turboprop engine, or an unducted fan when the turbine engine is of the "open rotor" type, or a ducted fan when the turbine engine is a turbojet engine, a compressor, a combustion chamber and a turbine. The rotor of the compressor is connected to the rotor of the turbine and the first rotor by a drive shaft. An air flow is compressed in the compressor, then the compressed air is mixed with a fuel and burnt in the combustion chamber. The gases formed by the combustion pass through the turbine, which drives the compressor rotor and the thruster rotor.

The propeller or fan of the thruster rotor and the rotor of the compressor are equipped with vanes that allow them to exert an action on the air flow. In order to adapt the turbine engine to flight conditions, it is known to equip the thruster rotor or the rotor of the compressor with variable pitch angle vanes. To this end, the turbine engine comprises a control system for controlling the variable pitch angle vanes which comprises a control unit connected to a hydraulic actuator to rotate the vanes relative to a longitudinal axis of the vanes according to the orientation of the air flow.

In order to supply oil to the control system and in particular the hydraulic actuator, as well as to other elements of the turbine engine such as bearings and reducers, the turbine engine typically comprises an oil supply system. This supply system comprises, for example, a main tank connected to a second supply circuit on which a pump is mounted, enabling the suction of oil from the main tank and the circulation of this oil to the hydraulic actuator. The main tank typically comprises an enclosure with a bottom and top wall joined by transverse walls. The bottom wall comprises an aperture connected to the pump for the suction of the oil.

Certain phases of aircraft flight disrupt the oil supply to the hydraulic actuator. In fact, the aircraft can experience phases of flight during which the gravitational force is zero or negative. In the context of the disclosure, these phases of flight are referred to as the "0 g condition" when the gravitational force is zero, or the "negative g condition" when the gravitational force is reversed. During such phases of flight, the oil contained in the main tank is pressed against the upper wall of the tank opposite the aperture in the negative g condition, or the oil and air form a suspension charged with air bubbles in the 0 g condition. As a result, the pump no longer suctions in oil but air or oil with a high air bubble content, which impairs the oil supply to the control system and can even cause the supply pump to stop. In all cases, the hydraulic actuator of the control system is no longer correctly supplied with oil.

Such a deterioration in the oil supply to the control system, and in particular to the hydraulic actuator, can render the pitch vanes of the thruster rotor uncontrollable, in particular the blades of the propeller or the unducted fan, which can lead to the vanes being feathered by a safety system. This significantly reduces the thrust of the turbine engine, leading to a loss of control, which is unacceptable.

Consequently, there is a need to provide a turbine engine for an aircraft that ensures a continuous supply of oil to the control system for controlling the variable pitch angle vanes, particularly during the phases of flight when the gravitational force is zero or negative.

SUMMARY

To this end, the disclosure proposes a turbine engine for an aircraft comprising: variable pitch angle vanes,
  a control system for controlling the vanes comprising:
  a control unit connected to at least one hydraulic actuator,
  an oil supply system comprising:
  a main oil tank,
  a supply pump comprising an inlet and an outlet connected to the control system.

The disclosure is characterized in that the supply system further comprises:
  an auxiliary oil tank, and
  a valve comprising a body having a first inlet connected to the main tank, a second inlet connected to the auxiliary tank and an outlet connected to the inlet of the supply pump, the valve further comprising a mobile member within the body and configured to move between a first position in which the first inlet of the valve is in fluid communication with the outlet of the valve and a second position in which the second inlet of the valve is in fluid communication with the outlet of the valve.

Thus, according to the disclosure, the oil supply system comprises an auxiliary tank and a valve. When the mobile member of the valve is in the first position, the supply pump suctions oil from the main tank. This first position is encountered in particular in the first operating state of the turbine engine. When the turbine engine is in a second operating state, in particular when the phases of flight of the aircraft in 0 g or negative g conditions, the mobile member of the valve is driven into the second position, and the supply pump suctions in oil from the auxiliary tank. The auxiliary tank is configured to deliver oil in a 0 g or negative g condition, unlike the main tank. As a result, the control system is supplied with oil during all phases of operation of the turbine engine. The thrust of the turbine engine is therefore optimal during all these phases of operation.

The disclosure may comprise one or more of the following characteristics, taken alone or in combination with each other:
  the auxiliary tank is a negative 0 g or g tank.
  a first oil supply circuit, connecting the main tank to at least one lubrication enclosure containing at least one bearing to be lubricated,
  a second oil supply circuit, connecting the main tank (15) to the control system and on which the valve and the supply pump are mounted, and
  an oil recovery circuit of the control system, connecting the control system to the auxiliary tank;
  a centrifugal pump arranged between the valve and the supply pump;
  an electrical control unit configured to control the displacement of the mobile member of the valve and a sensor configured to deliver a signal to the electrical control unit, the sensor being configured to detect an operating phase in which the gravitational force exerted on the turbine engine is zero or negative, the sensor being, for example, an accelerometer;

the mobile member of the valve is configured to move into the second position when the gravitational force exerted on the turbine engine is zero or negative;

a mechanical reducer and a variable diaphragm valve mounted on the second supply circuit, the variable diaphragm valve being arranged between the supply pump and the mechanical reducer, the variable diaphragm valve being able to open when the mobile member of the valve is in the first position and able to remain at least partially open or to close when the mobile member of the valve is in the second position;

the supply pump is connected in bypass to the second supply circuit between the valve and the variable diaphragm valve;

an air/oil exchanger arranged between the valve and the supply pump;

the auxiliary tank comprises an enclosure delimiting an internal volume of oil, the enclosure comprising at least a first outlet port connected to the main tank, an inlet port connected to the control system, and a second outlet port connected to the valve, the second outlet port being in fluid communication with the internal volume, the auxiliary tank further comprising a mobile retention wall able to equalize the volume of oil to the internal volume when the valve is in the second position;

the mobile retention wall comprises a retractable membrane formed by a wall of the enclosure;

the mobile retention wall comprises a mobile plate in translation in the enclosure, extending between two side walls of the enclosure, the second inlet of the valve is directly connected to the auxiliary tank.

The disclosure also relates to a method of supplying oil to an aircraft turbine engine according to any one of the preceding characteristics, comprising the following steps:

(a) during a first operating state of the turbine engine, supplying oil to the control system from the main tank, the valve being in a nominal operating state in which the mobile member is in the first position, (b) detecting the transition of the turbine engine to a second operating state, in particular an operating state in which the gravitational force exerted on the turbine engine is zero or negative, (c) following detection of step (b), actuating the valve to move the mobile member from the first position to the second position, so as to supply oil to the control system from the auxiliary tank, (d) detecting the transition of the turbine engine from the second operating state to the first operating state, (e) placing the valve in its nominal operating state by commanding a displacement of the mobile member from the second position to the first position, so as to supply oil to the control system from the main tank.

The disclosure may comprise one or more of the following characteristics, taken alone or in combination with each other:

the method comprises, between steps (b) and (c) as well as between steps (d) and (e), a step of transmitting an electrical signal to the valve by an electrical control unit, and in that a deactivation period (t1) is defined between the detection of the first operating state in step (d) and the displacement command in step (e);

an activation period (t2) is defined between the detection of the second operating state in step (b) and the actuation of the valve in step (c), the activation period (t2) being less than the deactivation period (t1);

(g) during the first operating state of the turbine engine, supplying oil from the main tank to the mechanical reducer with the variable diaphragm valve in the open position, (g') after the step of detecting (b) the second operating state of the turbine engine, closing the variable diaphragm valve in order to cut off the oil supply to the mechanical reducer from the auxiliary tank.

DESCRIPTION OF THE DRAWINGS

Further characteristics and advantages will be apparent from the following description of a non-limiting embodiment of the disclosure with reference to the appended drawings in which.

DETAILED DESCRIPTION

Figure 1:
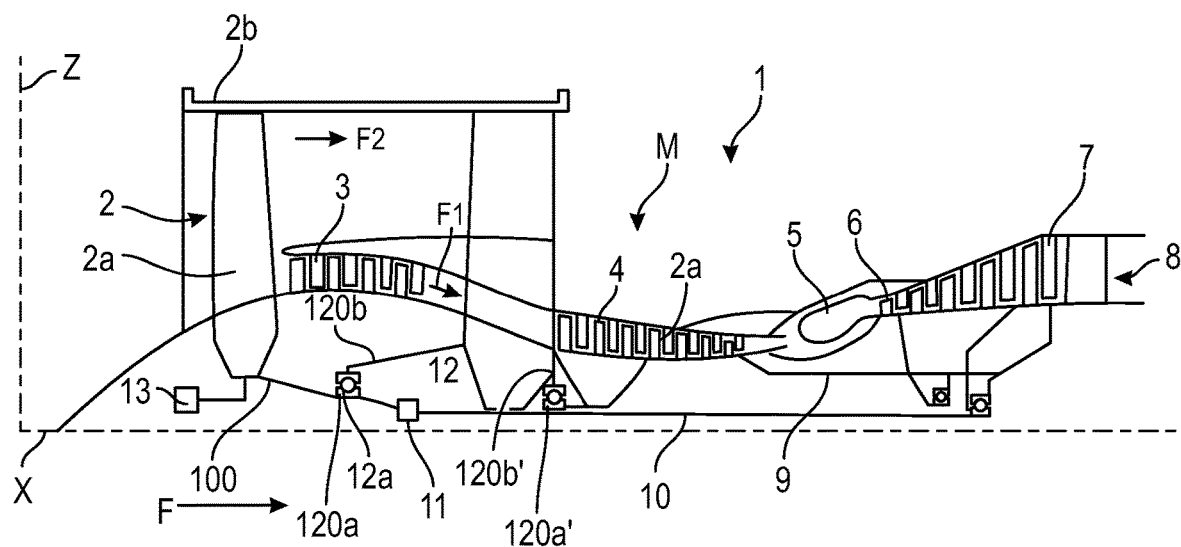
FIG. 1 is a schematic representation in longitudinal section of an aircraft half-turbine engine according to a first embodiment of the disclosure.
Figure 2:
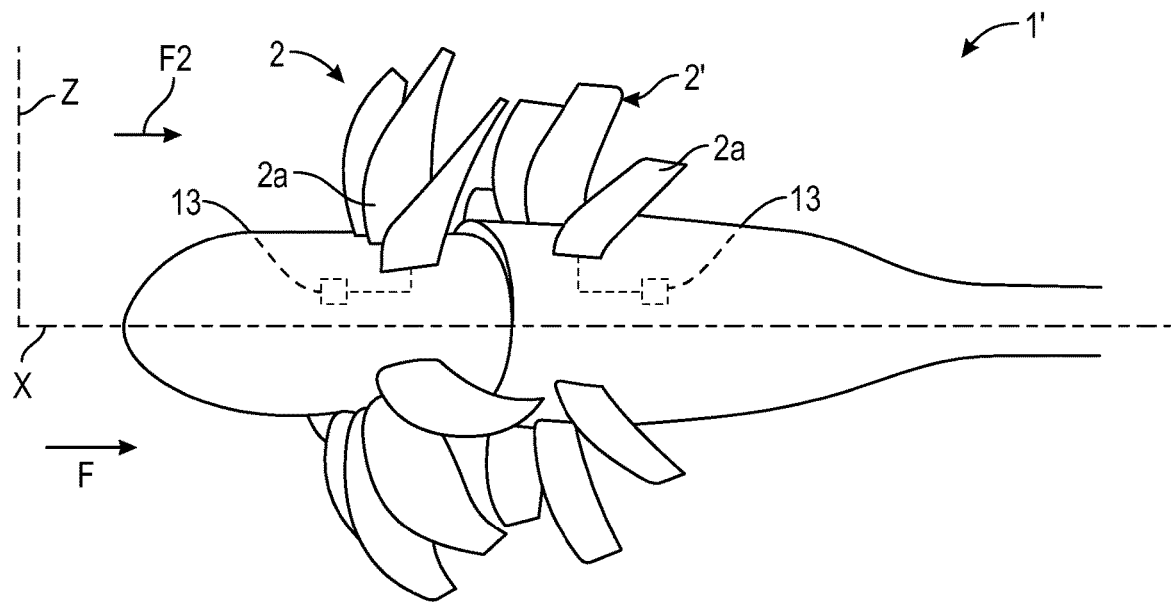
FIG. 2 is a schematic perspective representation of an aircraft turbine engine according to a second embodiment of the disclosure.
Figure 3:
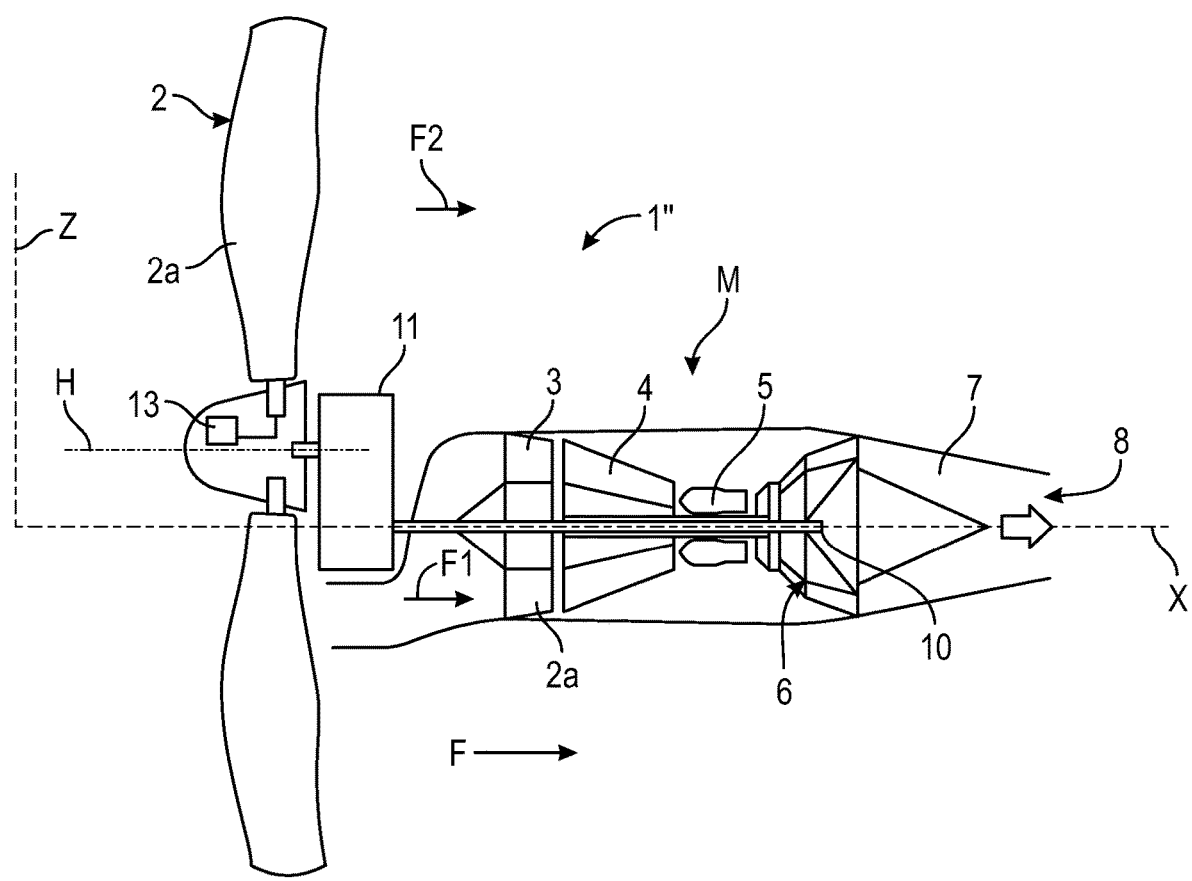
FIG. 3 is a schematic representation in longitudinal section of an aircraft turbine engine according to a third embodiment of the disclosure.

A turbine engine 1, 1', 1" for an aircraft is shown, for example, in FIGS. 1 to 3. The turbine engine 1, 1, 1" comprises a first rotor 2 connected to an engine M extending around a longitudinal axis X. The engine M comprises, from upstream to downstream in the direction of flow of a main air flow F along the longitudinal axis X, a compressor such as a low-pressure compressor 3 and a high-pressure compressor 4, a combustion chamber 5, a turbine such as a high-pressure turbine 6 and a low-pressure turbine 7, and a nozzle 8.

The rotor of the high-pressure turbine 6 is connected to the rotor of the high-pressure compressor 4 by a high-pressure shaft 9. The rotor of the low-pressure turbine 7 is connected to the rotor of the low-pressure compressor 3 by a low-pressure shaft 10.

The low-pressure shaft 10 and high-pressure shaft 9 are supported by bearings 12a. The bearings 12a are contained in a lubrication enclosure 12 for their lubrication. For example, an upstream bearing 120a is arranged radially between an upstream end of the low-pressure shaft 10 and an upstream bearing support 120b and a downstream bearing 120a' is arranged downstream of the upstream bearing 120a and radially between the low-pressure shaft 10 and a downstream bearing support 120b'. The lubrication enclosure 12 is annular. The upstream and downstream bearings 120a, 120a' are arranged in the lubrication enclosure 12.

The first rotor 2 is driven in rotation by a rotor shaft 100. The rotor shaft 100 is connected to the low-pressure shaft 10. The low-pressure shaft 10 drives in rotation the rotor shaft 100. Advantageously, the low-pressure shaft 10 is connected to the rotor shaft 100 by a speed reducer 11. This enables the first rotor 2 to be driven at a lower speed than the speed of rotation of the low-pressure shaft 10. The speed reducer 11 is for example arranged in the lubrication enclosure 12 and is arranged axially between the upstream bearing 120a and the downstream bearing 120a'.

The main air flow F passes through the turbine engine 1, 1', 1" and divides into a primary air flow F1 which passes through the engine M in a primary duct and a secondary air flow F2 which passes through the first rotor 2 in a secondary duct surrounding the primary duct.

The turbine engine 1, 1', 1" comprises vanes 2a that enable the main air flow F or primary air flow F1 or the secondary air flow F2 to be acted upon. For example, the rotors of low-pressure compressors 3 and high-pressure compressors 4 comprise vanes 2a which compress the primary air flow F1 upstream of the combustion chamber 5.

In general, the vanes 2a can be fixed in rotation about the longitudinal axis X or mobile in rotation about the longitudinal axis X or an axis parallel to the longitudinal axis X.

In a first embodiment shown in FIG. 1, the turbine engine 1 is a dual-flow turbojet engine. In this embodiment, the first rotor 2 is a ducted fan arranged upstream of the engine M. The fan comprises vanes 2a. The vanes 2a of the fan are mobile in rotation about the longitudinal axis X. They are carried, for example, by a disk centered on the longitudinal axis X and rotated by the rotor shaft 100. The vanes 2a are arranged inside a fan casing 2b. The casing 2b is surrounded by a nacelle (not shown).

In a second embodiment shown in FIG. 2, the turbine engine 1' is a turbojet engine with an unducted fan. In this embodiment, the first rotor 2 is a fan comprising vanes 2a. According to this embodiment, the fan is arranged downstream of the engine M (not visible in this figure). The fan is mobile in rotation about the longitudinal axis X. The vanes 2a of the fan are supported by a disk mobile in rotation about the longitudinal axis X. In addition, according to this embodiment, a stator vane 2' is optionally arranged downstream of the fan 2 in order to straighten the secondary air flow F2. The stator vane 2' forms a fixed blading about the longitudinal axis X. It comprises vanes 2a, which may have variable pitch. The vanes 2a are mounted on the outside of the nacelle.

In a third embodiment shown in FIG. 3, the turbine engine 1" is a turboprop engine. In this embodiment, the first rotor 2 is a propeller arranged upstream of the engine M. The propeller is mobile in rotation about a propeller axis H parallel to the longitudinal axis X and comprises vanes 2a. The vanes 2a are supported by a disk centered on the propeller axis H. The vanes 2a are, for example, at least two in number and evenly distributed over the disk.

The vanes 2a extend radially with respect to the longitudinal axis X. They typically comprise a blade and an element for attachment to the disk. The fixing element is, for example, a root or a fixing platform.

According to the disclosure, the vanes 2a have a variable pitch angle. By variable pitch angle, it is understood that the vanes 2a are mobile in rotation about a transverse axis Z substantially perpendicular or perpendicular to the longitudinal axis X.

In order to control the pitch angle of the vanes 2a, the turbine engine 1, 1', 1" according to the disclosure comprises a control system 13 of the variable pitch angle vanes 2a. The control system 13 comprises a control unit 13a and at least one hydraulic actuator 13b supplied with oil. The control unit 13a is, for example, stationary in rotation about the longitudinal axis X. The control unit 13a is connected, for example, to a stator of the turbine engine 1, 1', 1". The control unit 13a is known in the field of the disclosure by the acronym PCU for "Pitch Control Unit". The hydraulic actuator 13b is, for example, a hydraulic cylinder comprising a rod that is mobile in translation and is connected to the vane 2a, possibly via a transformation mechanism of the movement. The translational movement of the rod allows the vane 2a to rotate around its axis. The translational movement of the mobile rod is controlled by the control unit 13a, which supplies oil to the hydraulic actuator 13b. The hydraulic actuator 13b is mobile in rotation about the longitudinal axis X or about an axis parallel to the longitudinal axis X. The hydraulic actuator 13b is, for example, secured in rotation to the vanes 2a. The hydraulic actuator 13b, for example, is arranged upstream of the control unit 13a.

Advantageously, the control system 13 comprises a device for transferring oil 13c from the control unit 13a to the hydraulic actuator 13b. The oil transfer device 13c transfers oil from the control unit 13a, which is stationary in rotation with respect to the longitudinal axis X, to the hydraulic actuator 13b, which is mobile in rotation. The oil transfer device 13c is known by the acronym OTB for "Oil Transfer Bearing". The oil transfer device 13c is located in the lubrication enclosure 12, for example.

The turbine engine 1, 1', 1" also comprises an electrical control unit 24. The electrical control unit 24 is used to drive the control unit 13a. The electrical control unit 24 is, for example, a FADEC (Full Authority Digital Engine Control).

Figure 4:
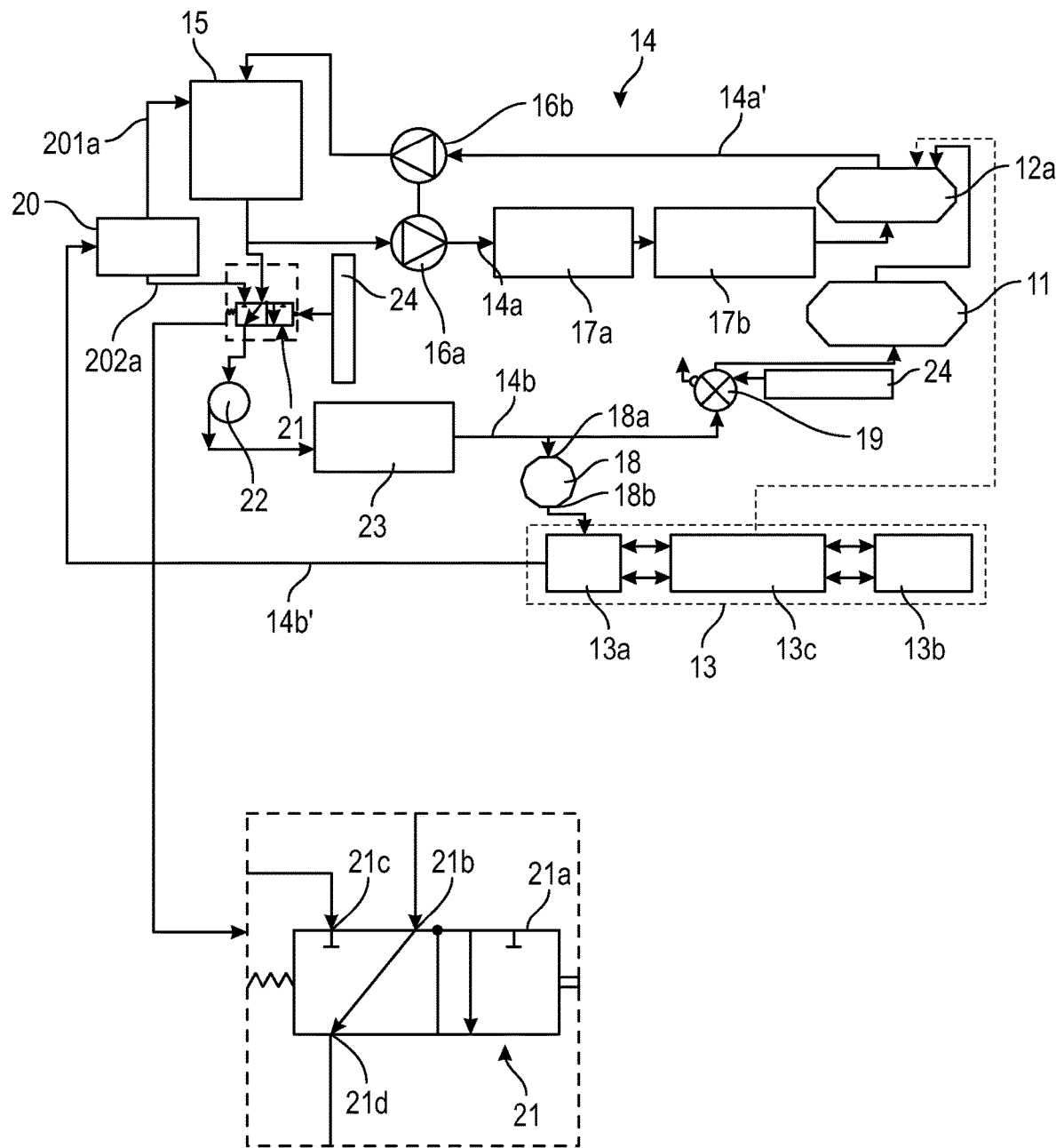
FIG. 4 is a schematic representation of the oil supply system of the disclosure.

In addition, the turbine engine 1, 1', 1" comprises an oil supply system 14 shown, for example, in FIG. 4. The supply system 14 ensures lubrication of the bearings 12a in the lubrication enclosure 12 and the reducer 11, and supplies oil to the hydraulic actuator 13b of the control system 13 for the variable pitch angle vanes 2a.

The supply system 14 comprises a first supply circuit 14a for the lubrication enclosure 12, also known as the main supply circuit, and a second supply circuit 14b for supplying oil to the reducer 11 and the control system 13.

Advantageously, the supply system 14 comprises an oil recovery circuit 14a' for recovering oil from the lubrication enclosure 12 and an oil recovery circuit 14b' for recovering oil from the control system 13.

The oil sent to the bearings 12a, for example the upstream bearing 120a and the downstream bearing 120a', to the reducer 11 and the oil leaks from the oil transfer device 13c, fall back to the bottom of the lubrication enclosure 12. To optimize oil consumption, this oil is recovered and directed, for example, into the recovery circuit 14a' of the lubrication enclosure 12.

According to the disclosure, the supply system 14 also comprises a main oil tank 15 connected to the first supply circuit 14a and to the second supply circuit 14b.

The first supply circuit 14a comprises a first pump 16a allowing oil to be suctioned from the main tank 15 and circulated in the first supply circuit 14a. Advantageously, the first supply circuit 14a comprises a main air/oil exchanger 17a, and optionally an oil/fuel exchanger 17b, which are arranged between the first pump 16a and the lubrication enclosure 12. The oil/fuel exchanger 17b, for example, is arranged between the lubrication enclosure 12 and the main air/oil exchanger 17a.

The recovery circuit 14a' of the lubrication enclosure 12 comprises a second pump 16b connected to the lubrication enclosure 12 and to the main tank 15. The second pump 16b allows the suction of oil into the lubrication enclosure 12 and return to the main tank 15 via the first recovery circuit 14a' of the lubrication enclosure 12.

According to the disclosure, the oil supply system 14 comprises a supply pump 18 for supplying oil to the control system 13. The supply pump 18, for example, is connected in parallel to the second supply circuit 14b. The supply pump 18 is a hydraulic pump. The supply pump 18 is a positive displacement pump, for example. The positive displacement pump may have a stationary or variable displacement. The supply pump 18 comprises an inlet 18a and an outlet 18b connected to the control system 13.

During a first operating phase of the turbine engine 1, 1', 1", the first pump 16a suctions oil from the main tank 15 and supplies oil to the lubrication enclosure 12 via the main supply circuit 14a. The supply pump 18 also suctions oil from the main tank 15 and supplies it to the control system 13. During a second operating phase of the turbine engine 1, 1', 1", in particular when the aircraft is experiencing a flight phase in a 0 g or negative g condition, i.e., when the gravitational force is zero or reversed, the oil is pressed into the upper part of the main tank 15 while the lower part connected to the first pump 16a and to the inlet 18a of the supply pump 18 is occupied by air. In the case of zero gravity, an air-oil mixture is suspended in the tank 15 and in the case of reverse gravity, air occupies the lower part of the main tank 15 connected to the first pump 16a and to the inlet 18a of the supply pump 18. There is therefore a risk that the supply pump 18 will suction air or oil containing large amounts of air bubbles. This is not acceptable as the control system 13 must be relatively free of air bubbles so as not to compromise the operation of the control unit 13a and therefore the hydraulic actuator 13b which controls the pitch of the vanes 2a. The presence of air can also cause the supply pump 18 to stop. Therefore, in order to ensure a suitable oil supply for the control system 13 during the second phase of operation of the turbine engine 1, 1', 1", according to the disclosure, the oil supply system 14 further comprises an auxiliary tank 20 and a valve 21.

The auxiliary tank 20 is connected to the main tank 15 by a first pipe 201a. This ensures that oil is drained from the auxiliary tank 20, particularly during the first phase of operation.

The auxiliary tank 20 is configured to deliver oil during the second operating phase of the turbine engine 1, 1', 1", i.e., under 0 g and/or negative g conditions.

The auxiliary tank 20 comprises an enclosure 200. The enclosure 200 has a first outlet port 201 connected to the main tank 15 for example by the first pipe 201a, a second outlet port 202 connected to the valve 21 by a second pipe 202a and an inlet port 203 connected to the control system 13 by the recovery circuit 14b' of the lubrication enclosure 12. The enclosure 200 delimits an internal volume of oil. In addition, the auxiliary tank 20 comprises a retaining member 204.

Figure 5A:
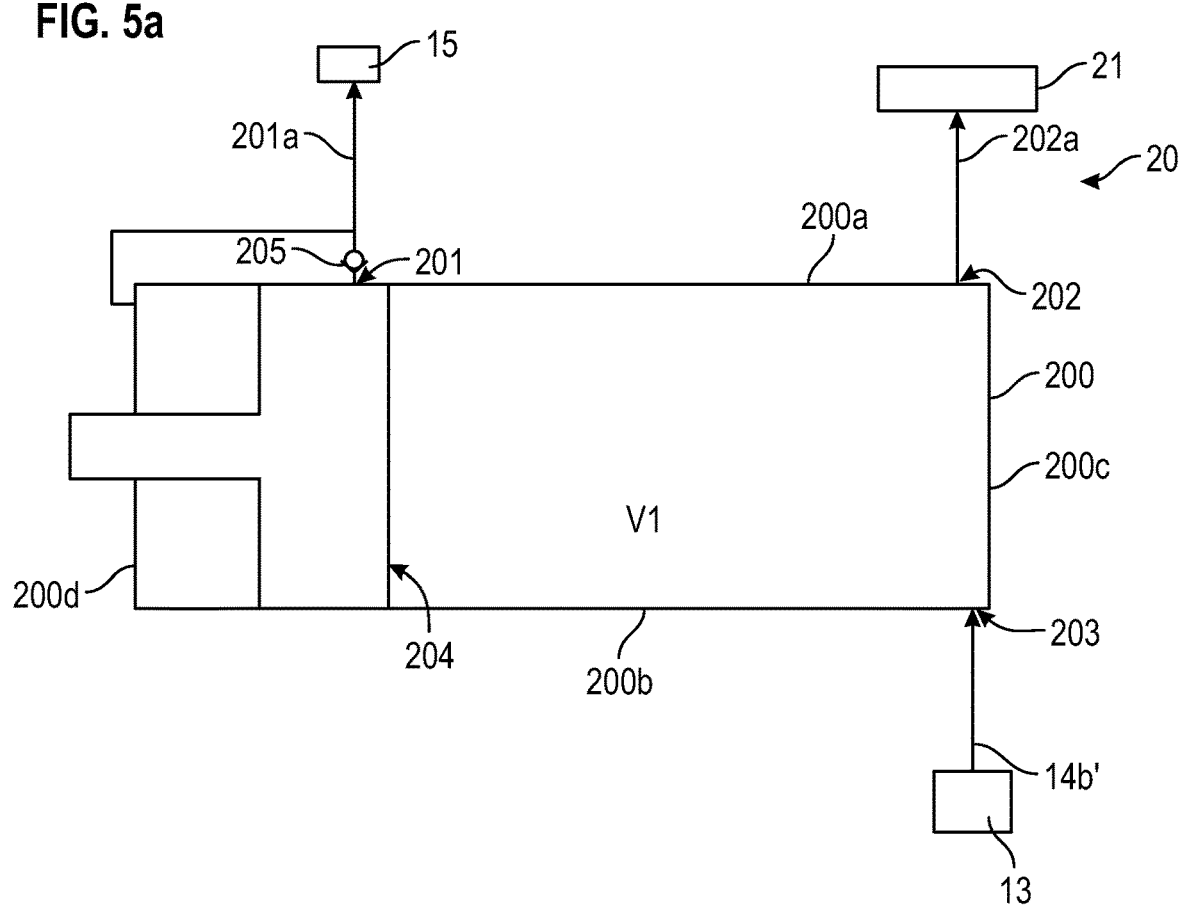
FIG. 5a is a schematic cross-sectional representation of an auxiliary tank in a first embodiment.
Figure 5B:
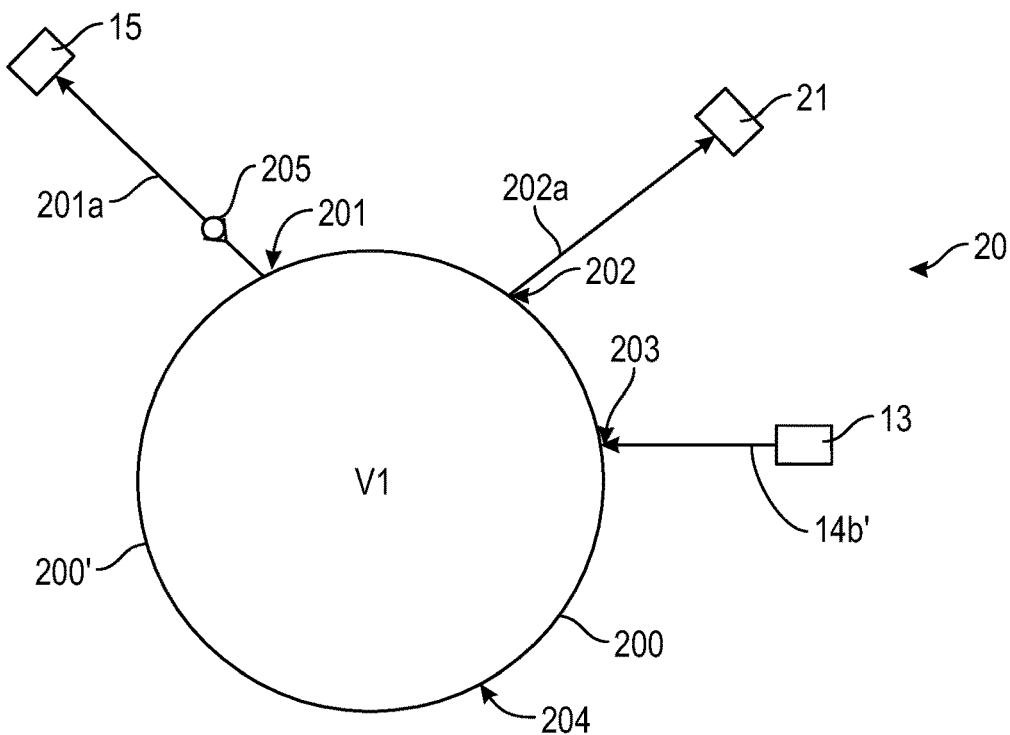
FIG. 5b is a schematic cross-sectional representation of an auxiliary tank in a second embodiment.

In a first embodiment shown in FIGS. 5a and 5b, the retaining member 204 is mobile. It is designed to equalize the volume of oil with the internal volume when the valve 21 is in the second position. The mobile retaining member 204 defines a variable volume V1 in the internal volume. The variable volume V1 varies between a first volume which is less than or equal to the internal volume and a second volume which is equal to the volume of oil in the auxiliary tank 20. According to this first embodiment, the supply system 14 advantageously comprises a non-return flap 205 arranged on the first pipe 201a.

According to a first example shown in FIG. 5a, the enclosure 200 has two parallel longitudinal walls 200a, 200b connected by two parallel side walls 200c, 200d. The mobile retaining member 204 comprises a mobile plate in translation in the enclosure 200 and extending between the two longitudinal walls 200a, 200b. The mobile plate may have faces parallel to the side walls 200c, 200d. The mobile plate is, for example, a piston.

According to a second example shown in FIG. 5b, the enclosure 200 is, for example, spherical or oblong. It comprises a wall 200' of circular cross-section. The mobile retention wall 204 is formed by the wall 200' of the enclosure 200. It comprises a retractable membrane. The retractable membrane is made of elastomer material, for example.

Figure 5C:
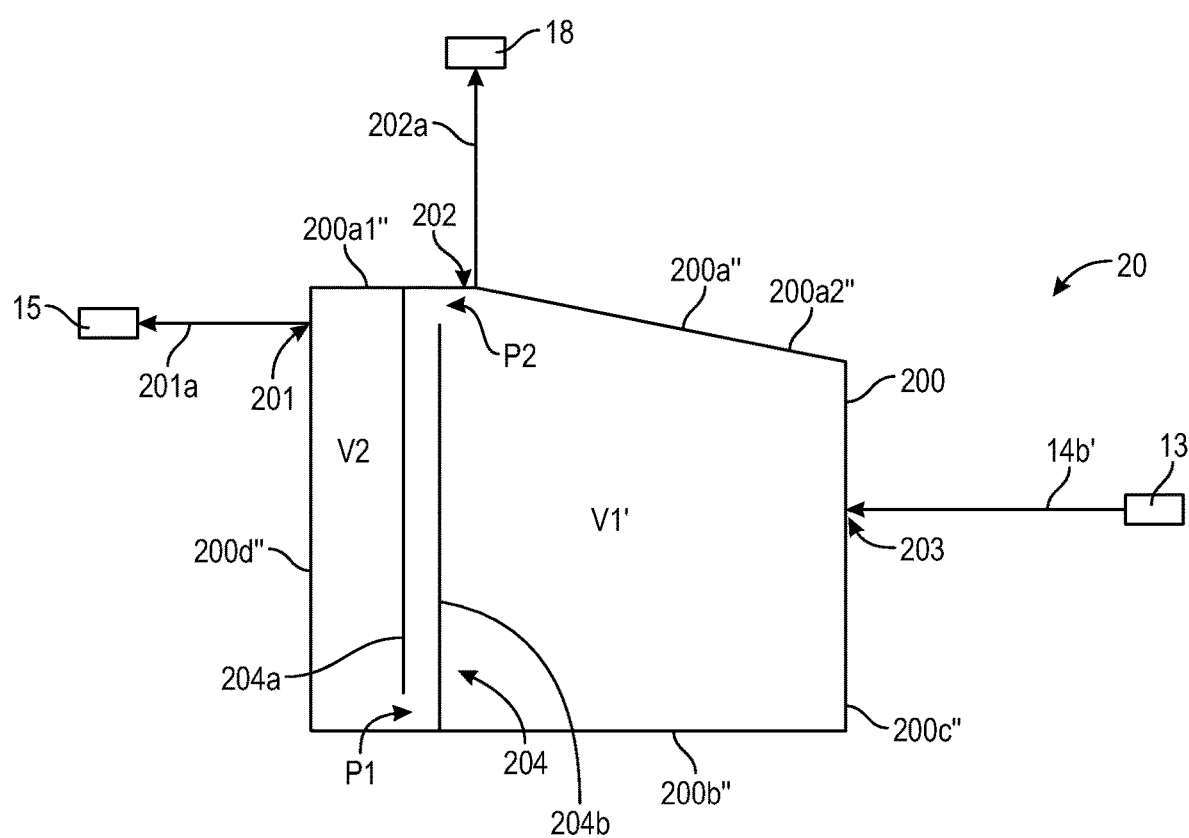
FIG. 5c is a schematic cross-sectional view of an auxiliary tank in a third embodiment.

In a second embodiment shown in FIG. 5c, the enclosure 200 is polygonal. It comprises a top wall 200a" and a bottom wall 200b" connected by opposing transverse walls 200c", 200d". The transverse walls 200c", 200d" are parallel to each other. The upper wall 200a" comprises, for example, a first portion 200a1" parallel to the lower wall 200b" and a second portion 200a2" inclined towards the inside of the enclosure 200 so as to define with the first portion 200a1" a top oriented towards the outside of the enclosure 200. The first outlet port 201 is formed, for example, on the transverse wall 200d" and the inlet port 203 is formed, for example, on the opposite transverse wall 200c". The second outlet port 202 is located on the top wall 200a", for example on the second portion 200a2". The retaining member 204 is, for example, a baffle arranged in the enclosure 200. The baffle comprises a first end wall 204a extending from the upper wall 200a" towards the lower wall 200b" and a second end wall 204b extending from the lower wall 200b" towards the upper wall 200a", the first end wall 204a and the lower wall 200b" defining a first fluid passage P1, and the second end wall 204b and the upper wall 200a" defining a second fluid passage P2. The first and second end walls 204a, 204b are parallel to the transverse walls 200c", 200d". The baffle separates a supply volume V1' and an adjustment volume V2. The supply volume V1' is in fluid communication with the second outlet port 202 and the adjustment volume V2 is in fluid communication with the first outlet port 201.

The valve 21 is mounted on the second supply circuit 14b. The valve 21 is a hydraulic valve. The valve is a 3/2-way directional valve, i.e. it has three apertures and two positions. The valve 21 is, for example, a directional valve with electrically or hydraulically spring-return control. The valve 21 has a body 21a with a first inlet 21b connected to the main tank 15 and a second inlet 21c connected to the auxiliary tank 20. The first inlet 21b is connected to the main tank 15 by an inlet pipe, for example. The inlet of the first pump 16a, for example, is connected to the inlet pipe.

The valve 21 also comprises an outlet 21d connected to the inlet 18a of the supply pump 18. The valve 21 further comprises a mobile member in the body 21a configured to move between a first position in which the first inlet 21b is in fluid communication with outlet 21d and a second position in which the second inlet 21c is in fluid communication with the outlet 21d. The valve 21 comprises, for example, a return spring for returning the mobile member from the second position to the first position.

It is therefore understood that, according to the disclosure, in the first position, the supply pump 18 suctions oil from the main tank 15 and in the second position, the supply pump 18 suctions oil from the auxiliary tank 20. The valve 21 thus controls the flow of oil in the second circuit 14b. When the turbine engine 1, 1', 1" is in the first operating phase, in particular when the aircraft is in a "normal" flight phase, in particular in a positive g condition, the valve 21 is in the first position and the main pump 18 suctions oil from the main tank 15 to supply at least the control system 13. When the turbine engine 1, 1', 1" is in the second operating phase, in particular when the aircraft is in a flight phase in which the gravitational force is zero (0 g condition) or negative (negative g condition), the valve 21 is in the second position and the supply pump 18 suctions oil from the auxiliary tank to supply the control system 13 with oil. The control system 13 is therefore supplied continuously from a same supply pump 18.

The auxiliary tank 20 is configured to communicate oil to the second outlet aperture 202 when the mobile member of the valve 21 is in the second position. In fact, in the first embodiment of the auxiliary tank 20, when the valve 21 is in the second position, the mobile retention wall 204 moves so that the variable volume V1 is equal to the volume of oil in the enclosure 200. The mobile retention wall 204 also closes off the first outlet port 201. In this way, the oil contained in the variable volume V1 is free of air and communicates with the second outlet port 202. The oil is then suctioned by the supply pump 18 and supplies oil to the control system 13 during the second operating phase of the turbine engine 1, 1', 1".

In the second embodiment of the auxiliary tank 20, the baffle allows to increase the time allowing the air, present in the adjustment volume V2 by penetrating the enclosure 200 via the first outlet aperture 201, to reach the supply volume V1', so that the second aperture 202 is in contact only with oil during the second phase of operation of the turbine engine 1, 1', 1".

In this way, the valve 21 in combination with the auxiliary tank 20 ensures a continuous supply of oil to the control system via a same supply pump 18. The oil supply system 14 does not, for example, require the presence of an electric pump for bearing, the drop in pressure at the inlet 18a of the supply pump 18 when it is connected to the main tank 15.

Figure 6A:
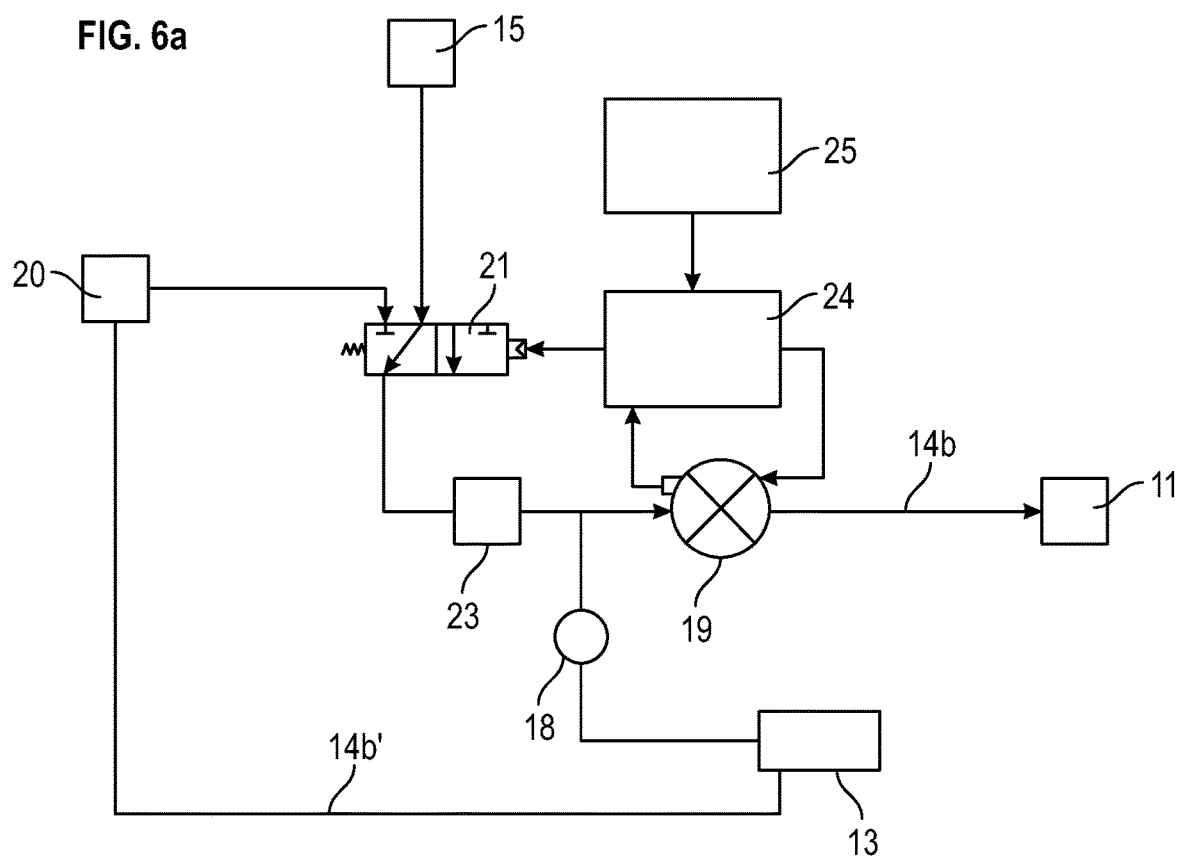
FIG. 6a is a schematic representation of a first embodiment of the oil supply system when the mobile member of the valve is in the first position.
Figure 6B:
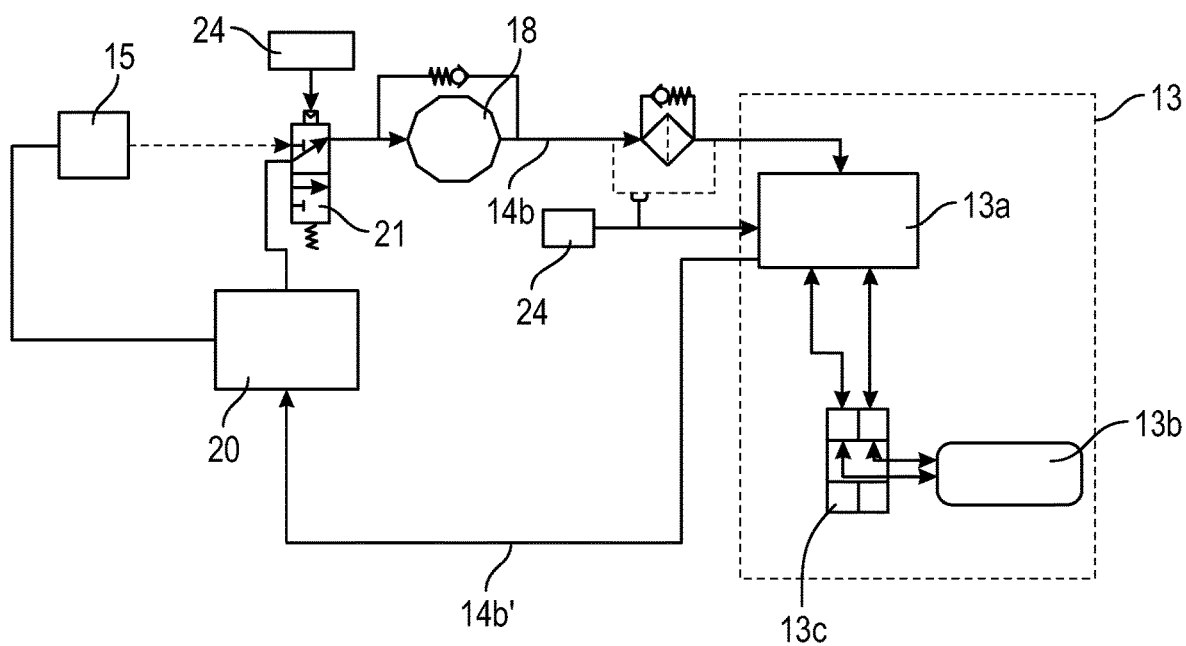
FIG. 6b is a schematic representation of the first embodiment of the oil supply system when the mobile member of the valve is in the second position.

In a first embodiment shown in FIGS. 6a and 6b, the valve 21 is electrically controlled. For simplification purposes, FIGS. 6a, 6b illustrate a portion of the second supply circuit 14b and the oil recovery circuit 14b' of the control system 13. However, the first supply circuit 14a and the recovery circuit 14a' are as described above. According to this embodiment, the turbine engine 1, 1', 1" comprises a sensor 25 configured to deliver a signal to the electrical control unit 24. The sensor 25 is configured to detect the first and second operating phases of the turbine engine 1, 1', 1". The sensor 25 is an accelerometer, for example.

FIG. 6a shows the valve 21 in its first position. The sensor 25 detects the first operating phase and sends a signal to the electrical control unit 24, which controls the mobile member in the first position. The main supply pump 18 suctions oil from the main tank 15.

FIG. 6b shows the valve 21 in the second position. The sensor 25 detects the second operating phase and sends a signal to the electrical control unit 24, which controls the mobile member in the second position. The main supply pump 18 suctions oil from the auxiliary tank 20.

Figure 7:
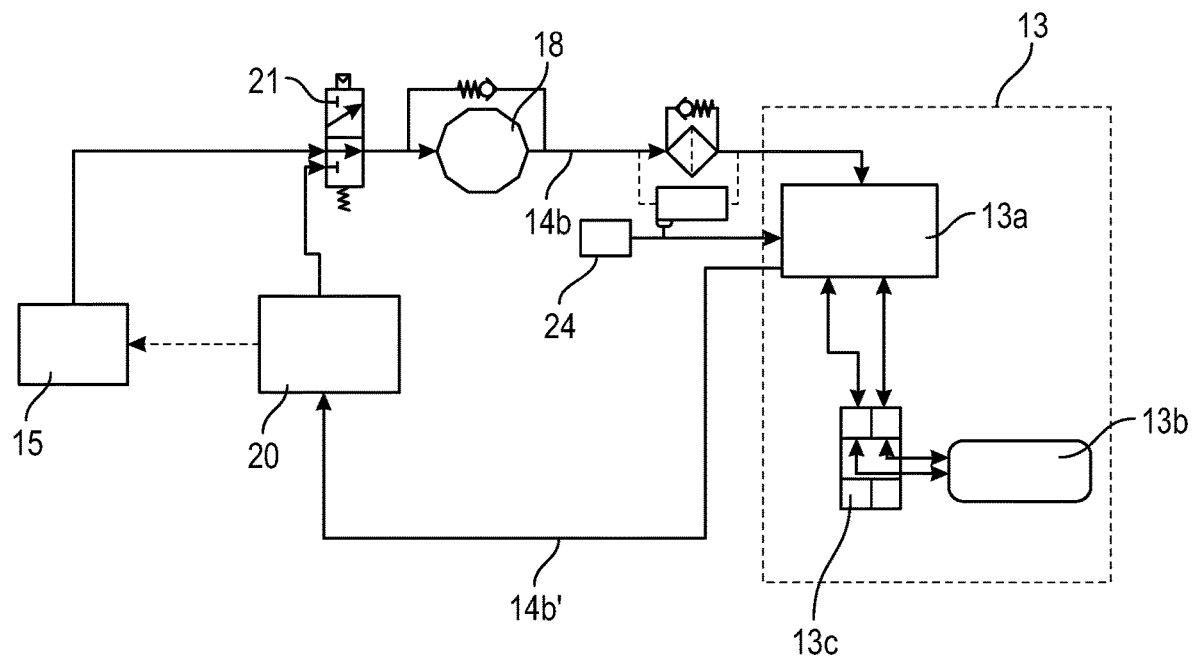
FIG. 7 is a schematic representation of a second embodiment of the oil supply system when the mobile member of the valve is in the first position.

In a second embodiment shown in FIG. 7, the mobile member of the valve 21 is directly sensitive to the gravitational force exerted on the turbine engine 1, 1', 1". When the gravitational force is greater than a given threshold, i.e., in the first operating state, the mobile member is in the first position. The main pump 18 suctions oil from the main tank 15 as shown in FIG. 7. When the gravitational force is zero or negative, the mobile member is controlled to the second position. The main supply pump 18 suctions oil from the auxiliary tank 20.

According to an advantageous embodiment of the disclosure, as illustrated in FIG. 4, the supply system 14 comprises a centrifugal pump 22 mounted on the second supply circuit 14. The centrifugal pump 22 is located between the valve 21 and supply pump 18.

According to a further advantageous embodiment of the disclosure shown in FIG. 4, a second air/oil exchanger 23 is arranged between the valve 21 and the supply pump 18. More specifically, the air/oil exchanger 23 is arranged between the centrifugal pump 22 and the supply pump 18. The centrifugal pump 22 and the air/oil exchanger 23 are mounted on the second supply circuit 14b. The centrifugal pump 22 increases the pressure in the second circuit 14b, upstream of the supply pump 18 and in particular upstream of the air/oil exchanger 23 in order to facilitate the passage of oil through the air/oil exchanger 23. The centrifugal pump 22 thus improves the operation of the supply pump 18, which has sufficient inlet pressure.

Advantageously, the supply system 14 comprises a variable diaphragm valve 19 mounted on the second supply circuit 14b. The variable diaphragm valve 19 is fitted between the supply pump 18 and the reducer 11. The supply pump 18 is mounted in bypass on the second supply circuit 14b between the valve 21, and in particular the air/oil exchanger 23 when present, and the variable diaphragm valve 19. Advantageously, the variable diaphragm valve 19 is able to open when the valve 21 is in the first position and is able to remain at least partially open and/or to close when the valve 21 is in the second position. Preferably, the variable diaphragm valve 19 is able to close when the valve 21 is in the second position. This allows the reducer 11 to be supplied with oil from the main tank 15 and the reducer 11 not to be supplied with oil from the auxiliary tank 20, so that the control system 13 can be supplied exclusively from the auxiliary tank 20. In this way, the auxiliary tank 20 is sized to supply only the control system 13, making it less bulky.

As better illustrated in FIG. 4 or FIG. 6a, advantageously, the opening and closing position of the variable diaphragm valve 19 is controlled by the electrical control unit 24. The electrical control unit 24 sends a signal to the variable diaphragm valve 19 to open or close the latter according to the operating phase of the turbine engine 1, 1', 1".

Figure 8:
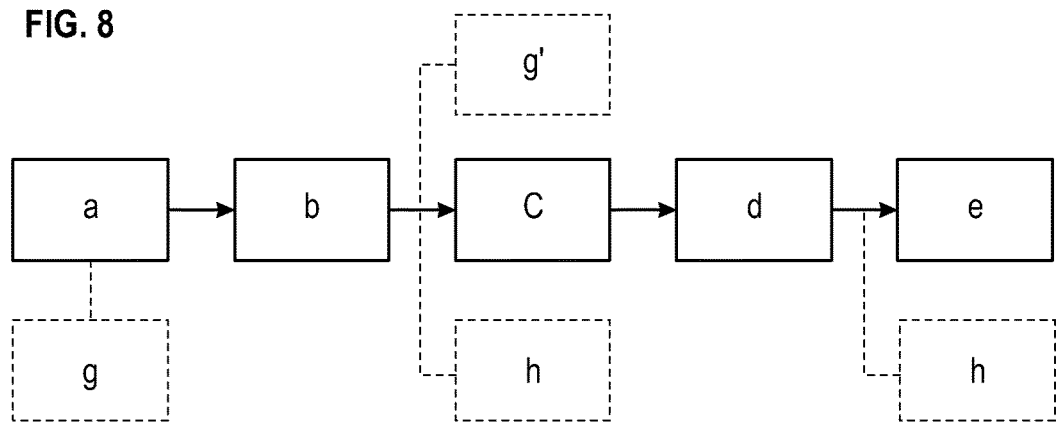
FIG. 8 is a block diagram of the method according to the disclosure.

A method of supplying oil to the turbine engine 1, 1', 1" will now be described. The method is illustrated in FIG. 8, for example.

The method comprises the following steps:
(a) during the first operating state of the turbine engine 1, 1', 1", supplying oil to the control system 13 from the main tank 15, the valve 21 being in a nominal operating state in which the mobile member is in the first position,
(b) detecting a second operating state of the turbine engine 1, 1', 1", the second operating state corresponding to zero or negative gravitational force being exerted on the turbine engine 1, 1', 1", then (c) actuating the valve 21 to move the mobile member from the first position to the second position to supply oil to the control system 13 from the auxiliary tank 20, (d) detecting the first operating state of the turbine engine 1, 1', 1", (e) placing the valve 21 in its nominal operating state by commanding a displacement of the mobile member from the second position to the first position to supply oil to the control system 13 from the main tank 15. During this stage, the mobile member is moved by the return spring, for example.

When the actuation of the valve 21 is electrical, i.e., the turbine engine 1, 1', 1" comprises the electrical control unit 24 and the sensor 25, then between the step of detecting the second state (b) and the actuation step (c) and between the step of detecting the first state (d) and the displacement step (e), then the method may comprise an additional step (h) of transmitting an electrical signal to the valve 21 by the electrical control unit 24.

Figure 9:
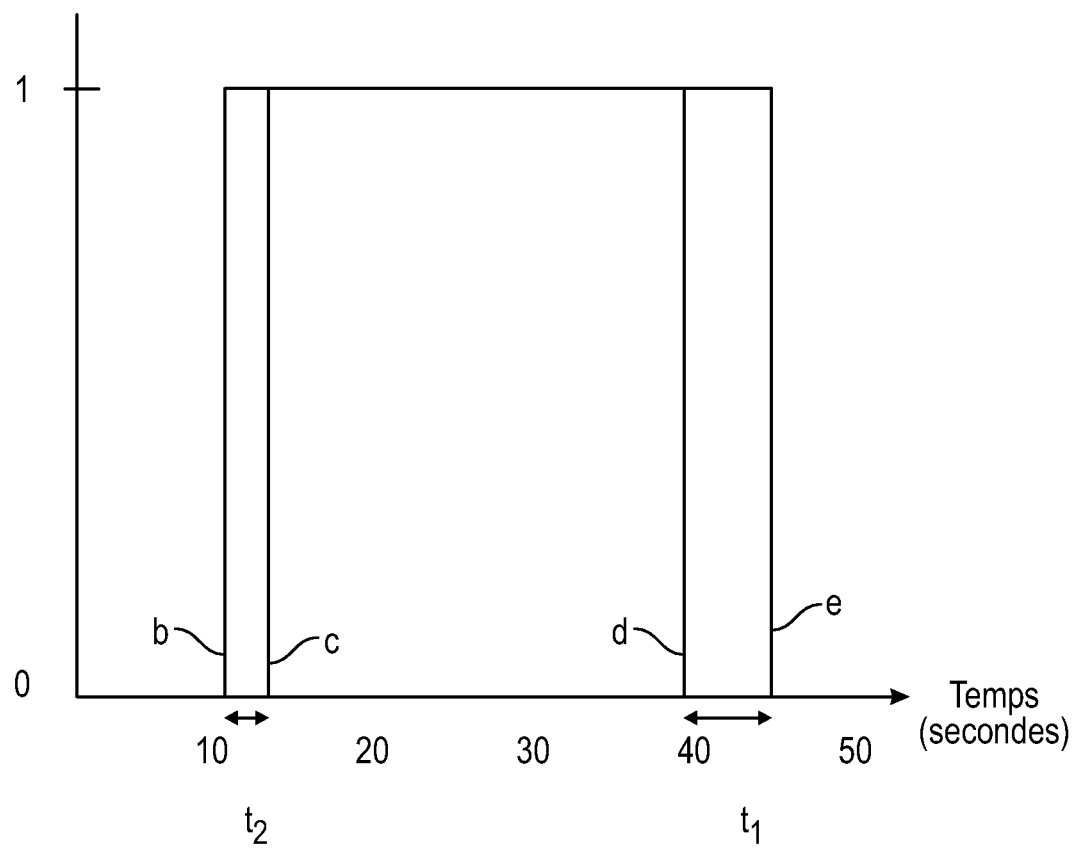
FIG. 9 is a time diagram illustrating position control of the valve in a first and second operating state.

Advantageously, as illustrated in FIG. 9, a deactivation period t1 is defined between the step (d) of detecting the first operating state and the step (e) of commanding the displacement of the mobile member from the second position to the first position. The deactivation period is, for example, between 1 s and 100 s, advantageously between 1 s and 50 s, preferably between 1 s and 10 s, and even more preferably between 1 s and 5 s. This deactivation time t2 allows the pipe connecting the main tank 15 to the valve 21 to refill with oil so that the supply pump 18 is suctioning oil and not air after step (d).

Advantageously, an activation period t2 is defined between the step of detecting (b) the second operating state and the step of actuating (c) the valve 21 to move the mobile member from the first position to the second position, the activation period t2 being less than the deactivation period t1. This activation retardation t2 optimizes the volume of the auxiliary tank 20. During the step (a), the valve 21 is connected to the main tank 15 and supply pump 18 suctions oil from main tank 15. The pipe connecting the main tank 15 to the valve 21 is therefore filled with oil. During the step (b), a draining time may elapse before the pipe connecting the main tank 15 to the valve 21 is drained of its oil. The supply pump 18 is therefore always supplied with oil during this draining time. The activation retardation t2 therefore takes this draining time into account, enabling the pump to suction oil from the auxiliary tank 20 only when the pipe connecting the main tank 15 to the valve 21 is drained of oil.

Advantageously, the method also comprises the following steps:

(g) during the first operating state of the turbine engine 1, 1', 1", supplying oil to the mechanical reducer 11 from the main tank 15, the variable diaphragm valve 19 being in the open position, (g') after step (b) of detecting the second operating state of the turbine engine 1, 1', 1", closing the variable diaphragm valve 19 in order to cut off the oil supply to the mechanical reducer 11 from the auxiliary tank 20. Preferably, during this stage, the variable diaphragm valve 19 is closed in order to supply oil exclusively to the control system 13 from the auxiliary tank 20. This allows to provide an auxiliary tank that takes up less space.

The invention claimed is:

1. A turbine engine for an aircraft, comprising:
    variable pitch angle vanes,
    a control system for controlling the vanes comprising a control unit connected to at least one hydraulic actuator, and
    an oil supply system comprising:
        a main oil tank,
        a supply pump comprising an inlet and an outlet connected to the control system,
        an auxiliary oil tank,
        a valve comprising a body having a first inlet connected to the main tank, a second inlet connected to the auxiliary tank and an outlet, the valve further comprising a mobile member in the body and configured to move between a first position in which the first inlet of the valve is in fluid communication with the outlet of the valve and a second position in which the second inlet of the valve is in fluid communication with the outlet of the valve, and
        a centrifugal pump arranged between the valve and the supply pump, the centrifugal pump having an inlet connected to the outlet of the valve and an outlet connected to the inlet of the supply pump, the oil flowing from the valve to the supply pump through the centrifugal pump.

2. The turbine engine according to claim 1, wherein the oil supply system further comprises:
    a first oil supply circuit, connecting the main tank to at least one lubrication enclosure containing at least one bearing to be lubricated,
    a second oil supply circuit, connecting the main tank to the control system and on which the valve and the supply pump are mounted, and
    an oil recovery circuit for the control system, connecting the control system to the auxiliary tank.

3. The turbine engine according to claim 2, further comprising a mechanical reducer, the supply system further comprising a variable diaphragm valve mounted on the second supply circuit, the variable diaphragm valve being arranged between the supply pump and the mechanical reducer, the variable diaphragm valve being configured to open when the mobile member of the valve is in the first position and to remain at least partially open or to close when the mobile member of the valve is in the second position.

4. The turbine engine according to claim 3, wherein the supply pump is mounted in bypass on the second supply circuit between the valve and the variable diaphragm valve.

5. The turbine engine according to claim 1, further comprising an electrical control unit configured to control the displacement of the mobile member of the valve and a sensor configured to deliver a signal to the electrical control unit, the sensor being configured to detect an operating phase in which a gravitational force exerted on the turbine engine is zero or negative.

6. The turbine engine according to claim 5, wherein the sensor is an accelerometer.

7. The turbine engine according to claim 1, wherein the mobile member of the valve is configured to move into the second position when a gravitational force exerted on the turbine engine is zero or negative.

8. The turbine engine according to claim 1, wherein the oil supply system further comprises an air/oil exchanger arranged between the valve and the supply pump.

9. The turbine engine according to claim 1, wherein the auxiliary oil tank comprises an enclosure delimiting an internal volume of oil, the enclosure comprising at least a first outlet port connected to the main tank, an inlet port connected to the control system and a second outlet port connected to the valve, the second outlet port being in fluid communication with the internal volume, the auxiliary oil tank further comprising a mobile retention wall configured to equalise the volume of oil to the internal volume when the valve is in the second position.

10. The turbine engine according to claim 9, wherein the mobile retention wall comprises a retractable membrane formed by a wall of the enclosure.

11. The turbine engine according to claim 9, wherein the mobile retention wall comprises a plate that is translationally mobile in the enclosure, extending between two side walls of the enclosure.

12. A method of supplying oil to the aircraft turbine engine according to claim 1, the method comprising the following steps:
   (a) during a first operating state of the turbine engine, supplying oil to the control system from the main tank, the valve being in a nominal operating state in which the mobile member is in the first position,
   (b) detecting a transition of the turbine engine to a second operating state in which a gravitational force exerted on the turbine engine is zero or negative,
   (c) following detection of step (b), actuating the valve to move the mobile member from the first position to the second position, so as to supply oil to the control system from the auxiliary tank,
   (d) detecting a transition of the turbine engine from the second operating state to the first operating state, and
   (e) placing the valve in the nominal operating state by commanding a displacement of the mobile member from the second position to the first position, so as to supply oil to the control system from the main tank.

13. The method according to claim 12, further comprising between steps (b) and (c) as well as between steps (d) and (e), a step of transmitting an electrical signal to the valve by an electrical control unit, wherein a deactivation period (t1) is defined between the detection of the first operating state in step (d) and the displacement command in step (e).

14. The method according to claim 13, wherein an activation period (t2) is defined between the detection of the second operating state in step (b) and the actuation of the valve in step (c), the activation period (t2) being less than the deactivation period (t1).

15. The method according to claim 12, wherein the turbine engine further comprises a mechanical reducer, the supply system further comprising a variable diaphragm valve mounted on the second supply circuit, the variable diaphragm valve being arranged between the supply pump and the mechanical reducer, the variable diaphragm valve being configured to open when the mobile member of the valve is in the first position and to remain at least partially open or to close when the mobile member of the valve is in the second position, the method further comprising the following steps:
   (g) during the first operating state of the turbine engine, supplying oil to the mechanical reducer from the main tank, the variable diaphragm valve being in the open position, and
   (g') after the step of detecting (b) the second operating state of the turbine engine, closing the variable diaphragm valve in order to cut off the oil supply to the mechanical reducer from the auxiliary tank.

16. A turbine engine for an aircraft, comprising:
   a mechanical reducer,
   variable pitch angle vanes,
   a control system for controlling the vanes comprising a control unit connected to at least one hydraulic actuator, and
   an oil supply system comprising:
      a main oil tank,
      a supply pump comprising an inlet and an outlet connected to the control system,
      an auxiliary oil tank,
      a valve comprising a body having a first inlet connected to the main tank, a second inlet connected to the auxiliary tank and an outlet, the valve further comprising a mobile member in the body and configured to move between a first position in which the first inlet of the valve is in fluid communication with the outlet of the valve and a second position in which the second inlet of the valve is in fluid communication with the outlet of the valve,
      a first oil supply circuit, connecting the main tank to at least one lubrication enclosure containing at least one bearing to be lubricated,
      a second oil supply circuit, connecting the main tank to the control system and on which the valve and the supply pump are mounted,
      an oil recovery circuit for the control system, connecting the control system to the auxiliary tank, and
      a variable diaphragm valve mounted on the second supply circuit, the variable diaphragm valve being arranged between the supply pump and the mechanical reducer, the variable diaphragm valve being configured to open when the mobile member of the valve is in the first position and to remain at least partially open or to close when the mobile member of the valve is in the second position.

* * * * *